(12) United States Patent
Burchardt et al.

(10) Patent No.: US 8,079,818 B2
(45) Date of Patent: Dec. 20, 2011

(54) METHOD FOR MANUFACTURING OF A FIBRE REINFORCED LAMINATE, USE OF A WRINKLE-PREVENTING MATERIAL, WIND TURBINE BLADE AND WIND TURBINE

(75) Inventors: Claus Burchardt, Gistrup (DK); Jens Joergen Ostergaard Kristensen, Nibe (DK); Michael Noerlem, Svenstrup (DK); Bendt Olesen, Klarup (DK)

(73) Assignee: Siemens Aktiengesellschaft, Munich (DE)

( * ) Notice: Subject to any disclaimer, the term of this patent is extended or adjusted under 35 U.S.C. 154(b) by 1065 days.

(21) Appl. No.: 11/986,037

(22) Filed: Nov. 19, 2007

(65) Prior Publication Data
US 2009/0175731 A1  Jul. 9, 2009

(30) Foreign Application Priority Data

Nov. 23, 2006  (EP) .................................... 06024335
Jul. 12, 2007  (EP) .................................... 07013723

(51) Int. Cl.
*F01D 5/14* (2006.01)
(52) U.S. Cl. ................ 416/223 R; 416/229 R; 416/230; 416/238; 416/241 A
(58) Field of Classification Search .............. 416/223 R, 416/229 R, 230, 238, 241 R, 241 A
See application file for complete search history.

(56) References Cited

U.S. PATENT DOCUMENTS

| 5,061,542 A | * | 10/1991 | Brace | 156/245 |
| 5,064,705 A | | 11/1991 | Donovan, Sr. | |
| 5,362,347 A | * | 11/1994 | Domine | 156/214 |
| 2005/0048260 A1 | | 3/2005 | Modin et al. | |

FOREIGN PATENT DOCUMENTS

| WO | 9520479 A1 | 8/1995 |
| WO | 2004071761 A1 | 8/2004 |

OTHER PUBLICATIONS

Polyspeed® G—EV 984GI—press cured laminate (Provisional Data Sheet), Hexcel Composites, pp. 1-2.

* cited by examiner

*Primary Examiner* — Igor Kershteyn

(57) ABSTRACT

A method for manufacturing of a fiber reinforced laminate is provided. A part of the laminate is build up to a determined thickness. A layer of wrinkle-preventing material is placed on top of the partially completed laminate. The layer of wrinkle-preventing material has a greater stiffness than the stiffness of a layer of similar thickness of the uncured laminate. Further on a new part of the laminate is build up to a determined thickness. In case the thickness of the laminate built up is not as large as a desired thickness of the completed laminate, the placing of the layer and the building of a new part of laminate is repeated until the thickness of the laminate built up is equal to the desired thickness of the completed laminate.

14 Claims, 3 Drawing Sheets

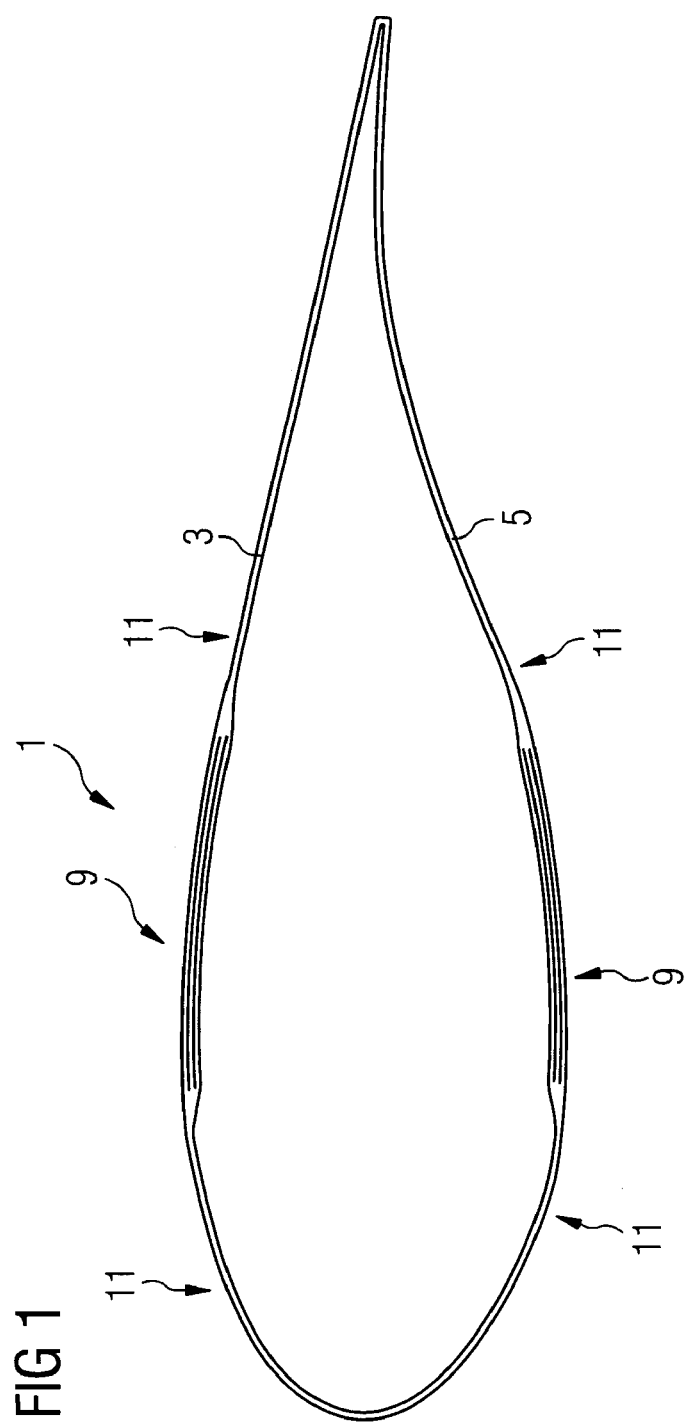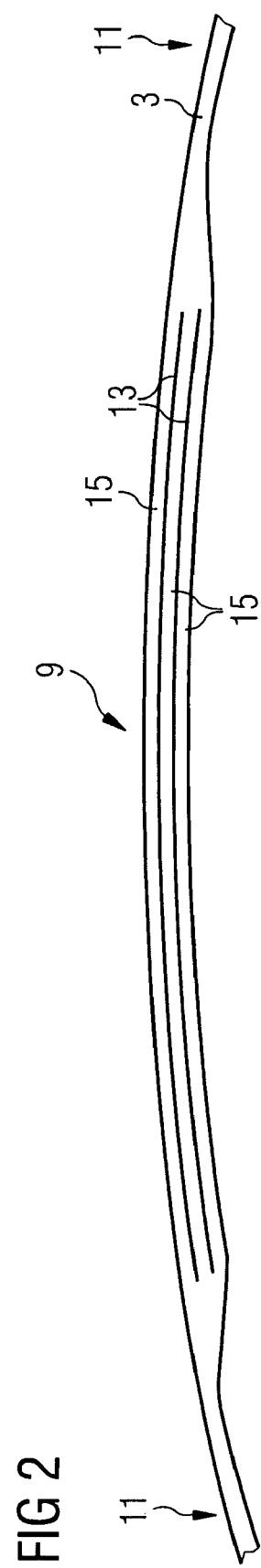

METHOD FOR MANUFACTURING OF A FIBRE REINFORCED LAMINATE, USE OF A WRINKLE-PREVENTING MATERIAL, WIND TURBINE BLADE AND WIND TURBINE

CROSS REFERENCE TO RELATED APPLICATIONS

This application claims priority of European Patent Office application No. 06024335 EP filed Nov. 23, 2006, and of European Patent Office application No. 07013723 EP filed Jul. 12, 2007 both of the applications are incorporated by reference herein in their entirety.

FIELD OF INVENTION

The present invention relates to a method for producing fibre reinforced laminate and to the use of a wrinkle-preventing material. In addition, the present invention relates to a wind turbine blade and a wind turbine.

BACKGROUND OF INVENTION

The structural characteristics of a fibre reinforced laminate are usually governed by the amount, type and orientation of the reinforcement fibres. Typically, the stiffness and strength of fibres can only be taken into account to the extent that loading occurs in the longitudinal fibre direction. Therefore, a traditionally designed laminate assumes that the fibres of the finished laminate will be oriented in the same direction as the direction of the fibres when placed in the mould. However, in some cases wrinkles in the fibre layers may occur as a result of the manufacturing process. In such cases the wrinkled fibres no longer have the desired orientation, and severe overload of the laminate may be the result.

Wrinkles in fibre reinforced laminates are typically prevented by a combination of arrangements. The laminate thickness is kept below certain limits in order to minimise exothermal heat generation. Moulds and other surfaces on which the laminate is built up are maintained at a high quality. Curing is carried out at carefully controlled temperature gradients so as to minimise differences in the thermal expansion.

If wrinkles do occur in fibre reinforced laminates despite preventive action repair or rejection of the laminate will usually be required, as the loss of stiffness and/or strength in wrinkles will often exceed any realistic safety margins.

SUMMARY OF INVENTION

It is therefore an objective of the present invention to provide a method for manufacturing the fibre reinforced laminate which overcomes the mentioned difficulties. It is a further objective of the present invention to provide a use for a wrinkle-preventing material. A still further objective of the present invention is to provide an improved wind turbine blade and an improved wind turbine.

A first objective is solved by a method for manufacturing a fibre reinforced laminate according to an independent claim. A second objective is solved by using a wrinkle-preventing material and a third objective is solved by a wind turbine blade as claimed in a further independent claim and a wind turbine.

In the inventive method for manufacturing a fibre reinforced laminate a part of the laminate is built up to a determined thickness. A layer of wrinkle-preventing material is placed on top of the partially completed laminate where the layer of wrinkle-preventing material has a greater stiffness than the stiffness of a layer of similar thickness of the uncured laminate. Then, a further part of the laminate is built up to a determined thickness. In case the thickness of the laminate built up by the mentioned process is not as large as a desired thickness of the completed laminate placing a layer of wrinkle-preventing material and a further part of the laminate is repeated until the thickness of the laminate built up is equal to the desired thickness of the completed laminate.

By placing one or more layers of wrinkle-preventing material inside the partially completed laminate, the occurrence of wrinkles can be prevented in fibre reinforced laminates. Depending on the number of wrinkle-preventing layers, the method may have the further advantage that any wrinkles occurring despite the efforts of the wrinkle-preventing layers will be confined to the space between two layers of wrinkle-preventing material, or to the space between the surface of the laminate and a layer of wrinkle-preventing material. By thus confining the wrinkles to a limited thickness of the laminate, the reduction of strength and/or stiffness can be shown to be within the allowance of relevant safety factors.

The inventive method is based on the following observations:

Wrinkles may occur for a number of reasons. The thermal expansion of a laminate during curing may exceed the thermal expansion of the mould in which case the laminate may come under compressive pressure before the matrix material, which is typically a thermoplastic or a thermosetting material, is cured sufficiently to maintain the fibres in the desired orientation. Uneven structures underneath the laminate or undulations in the surface on which the laminate is built up may also induce wrinkles.

While, as mentioned above, in the state of the art the formation of wrinkles has been prevented by keeping the laminate thickness below certain limits, maintaining the moulds and other surfaces on which the laminate is built up at high quality and carrying out curing at controlled temperature gradients the inventive method offers a new way of preventing wrinkle formation or at least for keeping the detrimental effects of wrinkles in a laminate within acceptable limits. The inventive method can therefore provide a relief of the limits used in the state of the art, i.e. the limits for the thickness of the laminate, the allowed evenness of the mould or any other surface on which the laminate is built up and the temperature gradient used during curing. On the other hand, the limit can be kept as stringent as in the state of the art in order to provide higher quality laminates, i.e. laminates with a reduced number of wrinkles, as compared to state of the art laminates.

In the inventive method a layer of wrinkle-preventing material may be placed as the lowermost layer of the laminate and/or as the uppermost layer of the laminate. This would enhance the strength and/or stiffness of the part of the laminate which will become a surface after curing and dismantling the mould.

A pre-cured layer of the same material as the material of the fibre layers may be used as the layer of wrinkle-preventing material. Pre-curing leads to a higher stiffness and/or strength of the material compared to its uncured state. Using the same material would have the advantage that only one kind of fibre reinforcement material is present in the laminate structure. Such a pre-cured material can be a pre-cured solid, perforated or mesh-like laminate. Perforated or mesh-like laminates would offer the further advantage that the flow of the thermoplastic or thermosetting material in the curing process would be less hindered than with a solid material.

In an alternative implementation of the inventive method a pre-cured layer of a laminate material which is different to the laminate material of the fibre layers may be used. In this case the material of the pre-cured laminate layer is chosen such as to provide a desired stiffness ratio relative to the stiffness to the finished fibre reinforced laminate as the layer of wrinkle-preventing material. This embodiment offers the possibility of influencing the mechanical properties of the finished fibre reinforced laminate by suitably selecting the laminate material of the pre-cured layer. Also in this implementation, the pre-cured layer may be a pre-cured solid, perforated or mesh-like laminate.

In a still further implementation of the inventive method a non-laminate layer, for example of wooden or metallic material, may be used as the layer of wrinkle-preventing material. For the non-laminate layer a solid, mesh-like or perforated layer may be used as the n-on-laminate wrinkle-preventing material.

According to the invention a use for a wrinkle-preventing material is also provided in a method for manufacturing a fibre reinforcement laminate. As has been described with respect to the inventive method, the wrinkle-preventing material may be the same but pre-cured material as the fibre layers of the fibre reinforced laminate. Alternatively, the wrinkle-preventing material may be a material which is different to the material of the fibre layers. The material is then chosen such as to provide a desired stiffness ratio relative to the stiffness of the finished fibre reinforcement laminate. As a further alternative, the wrinkle-preventing material may be a non-laminate material, for example a wooden or metallic material. Irrespective of the chosen material the wrinkle-preventing material may be provided in the form of a solid, a mesh-like or a perforated material. The advantages of the different types of material for the wrinkle-preventing material have already been discussed with respect to the inventive method.

An inventive wind turbine blade comprises a fibre reinforced laminate with at least one embedded anti-wrinkle layer. In particular, the fibre reinforced laminate may be comprised in an aerodynamic shell of the blade. The fibre reinforced laminate can be manufactured according to the inventive method. The embedded anti-wrinkle layer would then correspond to the layer of wrinkle-preventing material of the inventive method.

The inventive wind turbine blade could have an improved laminate structure compared to state of the art wind turbine blades as the formation of wrinkles can be prevented or at least reduced by the embedded anti-wrinkle layer. Alternatively, the mechanical properties could be kept the same as in state of the art wind turbine blades. In this case, a wind turbine blade comprising a laminate structure with an anti-wrinkle layer could be manufactured with less effort and thus less costs since the anti-wrinkle layer would allow for releasing the restrictions on the quality of the mould or any surface on which the laminate structure is built up, the restrictions on the laminate thickness and/or the restrictions temperature gradient used when curing the laminate.

An inventive wind turbine comprises an inventive wind turbine blade with all of the advantages mentioned above.

BRIEF DESCRIPTION OF THE DRAWINGS

Further features, properties and advantages of the present invention will become clear from the following description of an embodiment of the invention in conjunction with the accompanying drawings.

FIG. 1 schematically shows a section through a laminated wind turbine rotor blade.

FIG. 2 shows a detail of FIG. 1.

DETAILED DESCRIPTION OF INVENTION

Figure 3:
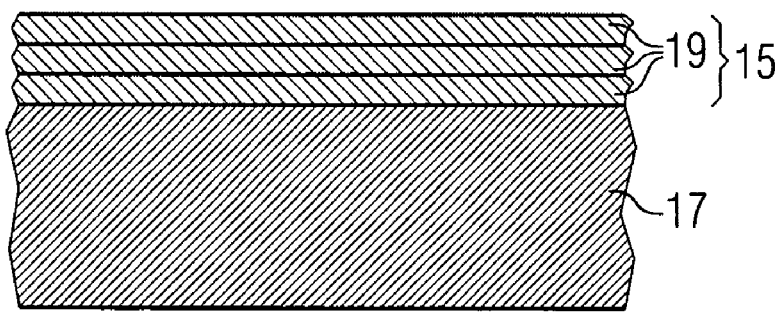
FIG. 3 schematically shows a first stage in the process of producing a rotor blade according to FIG. 1.

FIG. 1 is a schematic view of the cross-section of a laminated wind turbine rotor blade 1. The rotor blade 1 is made of an upper shell 3 and a lower shell 5 each comprising a thickened section 9 and non thickened sections 11. The upper and lower shells 3, 5 comprise a number of fibre reinforcement layers which are not individually shown in the figure. In the thickened section 9 the number of reinforcement layers is increased with respect to the non-thickened sections 11.

The thickened section 9 of the upper shell 3 is shown in more detail in FIG. 2. In the thickened section 9, wrinkle-preventing layers 13 having a greater stiffness than the fibre reinforcement layers are present between stacks of fibre reinforcement layers 15. The fibre reinforcement layers 15, as well as the wrinkle-preventing layers 13, are embedded in a resin matrix which has been formed by resin infusion and subsequent curing of the resin. During the infusion and curing process the wrinkle-preventing layers 13 prevent the fibre reinforcement layers from the formation of wrinkles as the higher stiffness does not allow the fibre reinforcement layers sandwiched between the mould and a wrinkle preventing layer 13 or between two wrinkle preventing layers 13 to fold substantially in the direction perpendicular to the extension of the fibres in the fibre reinforcement layers.

The method of forming the wind turbine rotor blade 1 shown in FIGS. 1 and 2 will now be described with respect to FIGS. 3 to 5.

In general, the upper and lower shells 3, 5 of the rotor blade 1 are produced by placing dry fibre reinforcement layers on top of each other in a mould, wetting the fibre reinforcement layers by means of a resin infusion and subsequently curing the resin. Please note that although described with respect to producing a wind turbine rotor blade 1, the method which will be described with respect to FIGS. 3 to 5 can also be used for producing other fibre reinforced laminated structures, e.g. in boat building.

A first stage of the method for manufacturing the rotor blade 1 shown in FIG. 1 is shown in FIG. 3. The figure schematically shows a cut-out sectional view of the mould 17 and a number of fibre reinforcement layers 19, e.g. glass fibre layers, carbon fibre layers or aramid fibre layers, which are placed dry in the mould 17 on top of each other so as to form a stack 15 of the fibre reinforcement layers 19.

Figure 4:
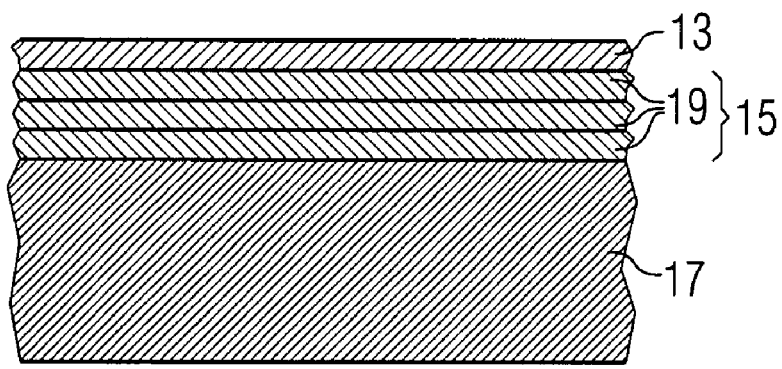
FIG. 4 shows a second stage in the process of producing a rotor blade according to FIG. 1.

After a stack 15 of fibre reinforcement layers has been placed in the mould 17 a wrinkle-preventing layer 13 is placed on top of the stack 15 (see FIG. 4).

Figure 5:
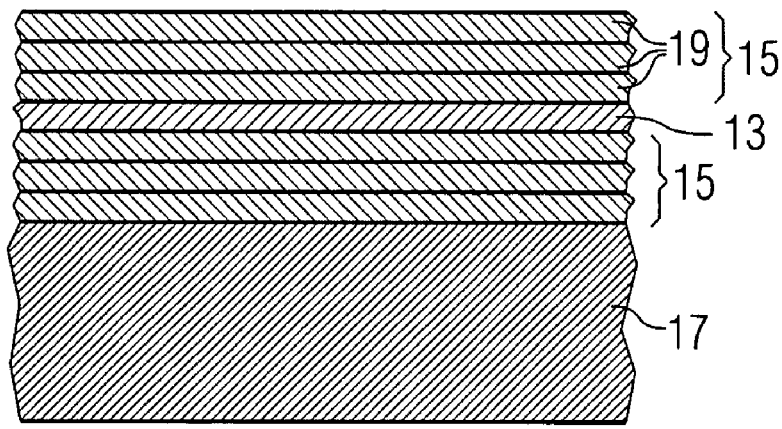
FIG. 5 shows a third stage in the process of producing a rotor blade according to FIG. 1.

After the wrinkle-preventing layer 13 has been placed on top of the first stack 15 of fibre reinforcement layers 19, another stack 15 comprising a number of fibre reinforcement layers 19 is placed on top of the wrinkle-preventing layer 13, as shown in FIG. 5.

Alternately layering stacks 15 of fibre reinforcement layers 19 and wrinkle-preventing layers 13 can be continued until the desired thickness of the layering is reached. The number of fibre reinforcement layers 19 in a stack 15 can be as high as possible without negatively influencing the wrinkle-preventing effect of the wrinkle-preventing layers 13.

Although not shown in FIG. 3 to 5, one or more additional wrinkle-preventing layers 13 may be present under the lowermost stack 15 of fibre reinforcement layers 19. In this case, a wrinkle-preventing layer 13 would be the first layer placed in the mould 17. The outermost layer of the overall stack consisting of stacks 15 of fibre reinforcement layers 19 alternating with wrinkle-preventing layers 13 may also be at least one wrinkle-preventing layer 13.

After the layering of the dry fibre reinforcement layers 19 and the dry wrinkle-preventing layers 13, the mould 17 is closed and a vacuum is applied to the mould. Then, a thermoplastic or thermosetting material such as the already mentioned resin, e.g. a polyester resin or an epoxy resin, is infused into the evacuated mould. The resin wets the fibre reinforcement layers and the wrinkle-preventing layers 13. After a while all fibre reinforcement layers 19, and also all wrinkle-preventing layers 13, are sufficiently wetted. Then, the resin is cured. After curing the resin, the mould 17 is dismantled.

During the curing process the wrinkle-preventing layers 13 prevent the fibre reinforcement layers 19 from forming wrinkles, i.e. from folding up in a direction substantially perpendicular to the extension of the fibres in the fibre reinforcement layers 19 since they have higher stiffness than the fibre reinforcement layers 19 so that they do not fold themselves. As a consequence, there is no or only minimal space available for the formation of wrinkles between the mould 17 and a wrinkle-preventing layer 13 or between two wrinkle preventing layers 13. Moreover, even if wrinkles would occur in a stack 15 of fibre reinforcement layers sandwiched between the mould 17 and a wrinkle-preventing layer 13 or between two wrinkle preventing layers 13 such wrinkles would be confined to this particular stack 15 by the wrinkle-preventing layer(s) 13 since the wrinkles cannot propagate through the stiff wrinkle-preventing layer(s) 13.

Examples of wrinkle-preventing layers 13 that may be used in the described method are shown in FIGS. 6 to 9.

Figure 6:
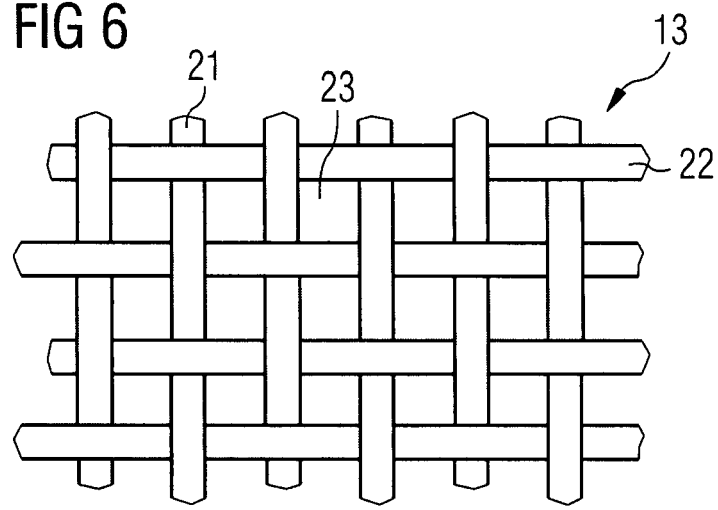
FIG. 6 shows a first example of a wrinkle-preventing layer used in the process of producing a rotor blade as shown in FIG. 1 in a top view.
Figure 7:
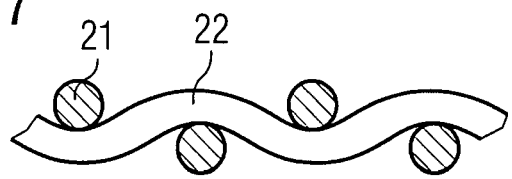
FIG. 7 shows the wrinkle-preventing layer of FIG. 6 in a sectional view.

FIGS. 6 and 7 show a wrinkle-preventing layer 13 which is implemented as a mesh-like woven mat of a pre-cured laminate material. While FIG. 6 shows a top view onto the mat, FIG. 7 shows a sectional view through the mat.

The laminate material of the mat may be, but does not need to be, the same material as the material of the fibre reinforcement layers 19. In the present embodiment of the invention the woven mat is made from a glass fibre epoxy laminate, such as, for example, the Hexcel Polyspeed G-EV 984GI laminate type.

Due to the fact that the mat is pre-cured its stiffness is higher that the stiffness of the not yet cured fibre reinforcement layers 19. The mesh-like structure of the wrinkle-preventing layer 13 allows for a flow of resin through the layer. As can be seen from the figures, threads 21, 22 of the woven structure provide space for a resin flow through the wrinkle-preventing layer 13 above and below the threads 21, 22. Moreover, resin can flow through openings 23 between neighbouring threads from one side of the woven mat to the other.

Please note that the corrugation of the mat due to its woven structure is exaggerated in FIG. 7 and that the corrugation is small enough so that the mat can be considered as being flat in the scale of the wrinkles the formation of which is to be prevented. Moreover, the lateral scale of the mat's corrugation is much less than the scale of the wrinkles the formation of which shall be prevented. As a consequence, the mat does not form a source of wrinkle formation itself.

Figure 8:
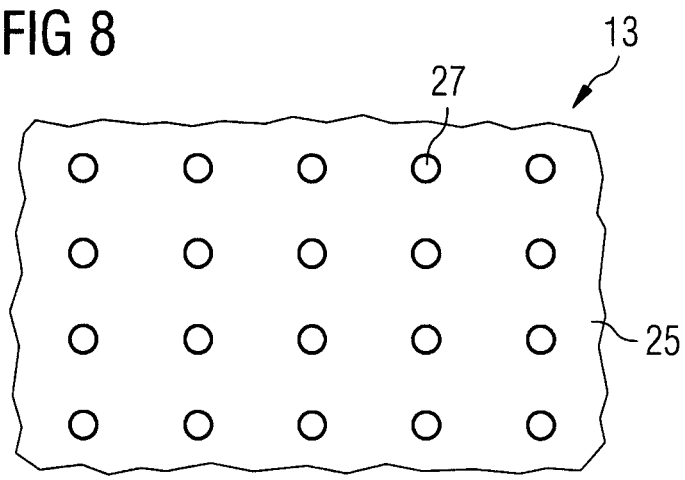
FIG. 8 shows a second example for a wrinkle-preventing layer used in the process of producing a rotor blade according to FIG. 1 in a top view.
Figure 9:
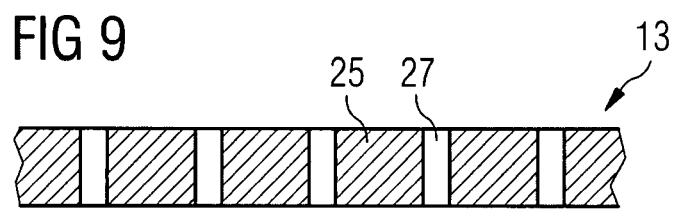
FIG. 9 shows the wrinkle-preventing layer of FIG. 8 in a sectional view.

FIGS. 8 and 9 show a wrinkle-preventing layer 13 which is implemented as a metal plate 25. While FIG. 8 shows a top view onto the metal plate 25, FIG. 9 shows a sectional view through the metal plate 25. Although the embodiment shown in FIGS. 8 and 9 is realised by a metal plate it could as well be realised by a plate of a different non-laminate material, for example wood, or by a plate of a pre-cured laminate material.

A flow of resin through the metal plate 25 can be made possible by optional perforation holes 27 through which resin may easily flow from one side of the metal plate 25 to the other. The perforation holes 27 may, for example, be punched or stamped into the plate 25.

In both depicted implementations of the wrinkle-preventing layer 13 it becomes possible to provide a desired stiffness ratio of the wrinkle-preventing layers 13 to the fibre reinforcement layers 19 after curing the resin by using selected materials.

The invention provides a method in which one or more layers of wrinkle-preventing material are placed inside a laminate. The method has the advantage that is prevents the occurrence of wrinkles in fibre reinforcement laminates. Depending on the number of wrinkle-preventing layers, the method may farther have the advantage that any wrinkles occurring despite the efforts with the wrinkle-preventing layers will be confined to the space between two layers of wrinkle-preventing material, or to the space between the surface of the laminate and a layer of the wrinkle-preventing material. By thus confining the wrinkle to a limited thickness of the laminate, the reduction of strength and/or stiffness can be shown to be within the allowance of relevant safety factors.

The invention claimed is:

1. A method for manufacturing a fiber reinforced laminate, comprising:
    building up a part of the laminate to a determined thickness, the part of the laminate comprising one or more fibre layers;
    placing a layer of a pre-cured material on top of the partially completed laminate, wherein the layer of pre-cured material has a greater stiffness than the stiffness of a layer of similar thickness of a uncured laminate;
    building up a new part of the laminate to a determined thickness; and
    increasing the thickness of the laminate if a desired thickness of the laminate is bigger, by:
        at least once or repeatedly placing a layer of the pre-cured material on top of the partially completed laminate, wherein the layer of the pre-cured material has a greater stiffness than the stiffness of a layer of similar thickness of the uncured laminate, and
        once or repeatedly building up a new part of the laminate to a determined thickness,
        until the thickness of the laminate built up is equal to the desired thickness of the completed laminate.

2. The method as claimed in claim 1, wherein a layer of the pre-cured material is placed as a lowermost layer of the laminate.

3. The method as claimed in claim 1, wherein a layer of the pre-cured material is placed as a uppermost layer of the laminate.

4. The method as claimed in claim 1, wherein the pre-cured material comprises the same material as that of the fibre layers.

5. The method as claimed in claim 1, wherein the pre-cured material is a pre-cured laminate material different from that of the fibre layers.

6. The method as claimed in claim 1, wherein a solid layer is used as the layer of the pre-cured material.

7. The method as claimed in claim 1, wherein a mesh-like or perforated layer is used as the layer of the pre-cured material.

8. A fibre reinforced laminate, comprising:
   a plurality of fibre layers with at least one layer of a pre-cured material embedded therewithin.

9. The fibre reinforced laminate as claimed in claim 8, wherein the pre-cured material comprises the same material as that of the fibre layers.

10. The fibre reinforced laminate as claimed in claim 8, wherein the pre-cured material is a pre-cured laminate material different from that of the fibre layers, the pre-cured material being adapted to provide a desired stiffness ratio relative to the stiffness of the finished fiber reinforced laminate.

11. The fibre reinforced laminate as claimed in claim 8, wherein the pre-cured material is a mesh-like material.

12. The fibre reinforced laminate as claimed in claim 8, wherein pre-cured material is a perforated material.

13. A wind turbine blade comprising an aerodynamic shell made up of a fibre reinforced laminate, the fibre reinforced laminate comprising a plurality of fibre layers with at least one layer of a pre-cured material embedded therewithin.

14. The wind turbine blade as claimed in claim 13, wherein the fibre reinforced laminate is manufactured by:
   building up a part of the laminate to a determined thickness, the part of the laminate comprising one or more fibre layers;
   placing a layer of a pre-cured material on top of the partially completed laminate, wherein the layer of the pre-cured material has a greater stiffness than the stiffness of a layer of similar thickness of a uncured laminate;
   building up a new part of the laminate to a determined thickness; and
   increasing the thickness of the laminate if a desired thickness of the laminate is bigger, by:
      at least once placing a layer of the pre-cured material on top of the partially completed laminate, wherein the layer of the pre-cured material has a greater stiffness than the stiffness of a layer of similar thickness of the uncured laminate and building up a new part of the laminate to a determined thickness,
      until the thickness of the laminate built up is equal to the desired thickness of the completed laminate.

* * * * *